INVENTOR.
LOY E. BARTON
BY [signature]
ATTORNEY

Aug. 27, 1963 L. E. BARTON 3,102,167
PHASE-SHIFTED DOUBLE-SIDEBAND TWO-CHANNEL
A.M. COMMUNICATIONS SYSTEM
Filed April 27, 1959 4 Sheets-Sheet 2

INVENTOR.
LOY E. BARTON
BY H. L. Newton
ATTORNEY

INVENTOR.
LOY E. BARTON
BY [signature]
ATTORNEY

INVENTOR.
LOY E. BARTON
BY
ATTORNEY

United States Patent Office 3,102,167
Patented Aug. 27, 1963

3,102,167

PHASE-SHIFTED DOUBLE-SIDEBAND TWO-CHANNEL A.M. COMMUNICATIONS SYSTEM

Loy E. Barton, Princeton, N.J., assignor to Radio Corporation of America, a corporation of Delaware Filed Apr. 27, 1959, Ser. No. 809,025
19 Claims. (Cl. 179—15)

The present invention relates to amplitude modulation (A.M.) signal transmission and reception systems, and more particularly to phase-shifted double-sideband two-channel A.M. signal transmission and reception systems for radio broadcast and other communications purposes in which the two modulation signals are each on both (upper and lower) sidebands of the transmitted carrier signal, that is, the transmitted signal is a double-sideband signal for both transmission channels. Thus, it is distinguished from single sideband systems for two-channel transmission, wherein one modulation signal is on one (lower) sideband, and the other modulation signal is on the other (upper) sideband.

Two-channel double-sideband amplitude modulation is presently being considered for A.M. stereophonic signal broadcast systems which will provide two-channel signal transmission and reception in one carrier wave. It is desirable that such stereophonic A.M. broadcast systems should provide sufficient stereophonic intelligence in the sidebands without seriously affecting normal monophonic reception by present conventional A.M. broadcast receivers.

It is also desirable that a stereophonic A.M. signal transmitter so transmit the two stereophonic channel signals that a relatively simple stereophonic receiver may be provided to separate and decode these signals and apply each to its respective sound output speaker system, while at the same time, as noted above, the transmission can also be received without appreciable degrading or signal loss by conventional A.M. signal receivers. In other words, it is desirable that there be good compatibility between stereo and monophonic reception.

For stereophonic and like two-channel A.M. signal broadcast and other communication systems, 90° phase-shifted (±45°) double-sideband signals have been suggested and tried. However, it has been found that such systems may have considerable harmonic distortion for standard A.M. monophonic reception. The problem of properly decoding the received signals and providing clear channel reception at the receiver for two-channel or stereo operation in this type of A.M. system has not heretofore been solved fully. Various circuits have been proposed for this purpose, including double heterodyne, sideband inversion, and exalted carrier circuits at the receiver. It is difficult to provide exalted-carrier signals which are free of phase and amplitude modulation, and there are inherent difficulties in maintaining the proper phase relation between the shifted carriers at the transmitter.

As referred to above, while a two-channel double-sideband A.M. broadcast system, utilizing a 90° angle (±45°) between channel sidebands, can provide substantially maximum signal output or relatively low signal loss for two-channel or stereophonic reception, it lacks good compatibility for various reasons, including the fact that the resultant harmonic distortion for monophonic or normal A.M. signal reception on a standard or conventional A.M. broadcast receiver is considered too high for good fidelity. A further problem is involved in obtaining clear separation of the two signal channels in any two-channel or stereophonic receiver that may be employed. Double heterodyne systems, and the like, involve difficulties in maintaining the phase relation of the two signals exactly enough at all times for proper separation.

It is, therefore, an object of this invention, to provide an improved phase-shifted double-sideband two-channel or stereophonic A.M. signal transmission and reception system that provides a high degree of compatibility between sterophonic and monophonic signal reception, and negligible signal loss and greatly reduced harmonic signal distortion for signal reception by conventional A.M. receivers.

It is a further object of the present invention, to provide an improved amplitude-modulation broadcast or communication system for two-channel or stereophonic signal transmission and reception, which operates to maintain substantially a constant phase relation between signal channels or sidebands with an angular relation to the carrier which is less than ±45° and more compatible with monophonic reception, and further provides effective channel separation and exalted carrier operation at the receiver.

It is also an object of the present invention, to provide an improved two-channel signal broadcast or communications system, of the phase-shifted double-sideband amplitude-modulation type, in which a high degree of carrier exaltation may be utilized in the signal receiving portion thereof without being subject to undesirable phase and amplitude modulation of the exalted carrier, and in which the phase relation of the phase-shifted exalted carrier components may be maintained substantially constant, for more effective signal channel separation and distortion free reproduction.

It is also a further object of this invention, to provide an improved two-channel signal broadcast or communications system, of the phase-shifted, double-sideband, amplitude-modulation type, in which the phase-shift of the sidebands from the transmitted and received carrier, or the angular relation of the sidebands to the carrier may be reduced, to ±25° to 30° and provide a higher degree of compatibility for both two-channel or stereophonic A.M. reception and standard or conventional monophonic A.M. reception.

While the relative phase of a carrier and its sideband components may be considered as being some constant phase angle, it should be understood that this relative phase is a time varying function. The process of amplitude modulation of a carrier frequency can be represented by the addition, to the vector representing the carrier signal, of a pair of vectors counter rotating at the audio modulation frequency. The counter rotating vectors may be resolved into component vectors in phase and in quadrature with the original carrier. The quadrature components cancel while the in-phase components add. If, however, a component at carrier frequency but differing in phase from the original carrier is added to this amplitude modulated signal, the resultant carrier component will bear some fixed phase relation to the original carrier phase along which the counter rotating modulation vectors add. It should be understood that it is this angle which is considered as the relative angle of the sidebands and carrier.

It is found that in accordance with the invention, there can be full and effective separation of stereophonic information from a received stereo or two-channel carrier despite the fact that the sidebands are less than the ±45° angle with respect to said carrier which known systems have heretofore relied upon to provide two-channel transmission and reception. Also, the two-channel A.M. signal broadcast or communication system of the present invention uses phase-shifted double sidebands with phase angles with respect to the carrier of much less than ±45° and yet produces a more compatible signal for the multitude of conventional single-channel or monophonic A.M.

broadcast receivers now in use. It has been found that the smaller phase-shift angle of ±30°, or slightly more or less, such as ±25° to 30°, for example, can be used effectively and provides substantially less harmonic distortion for standard A.M. signal reception, as compared with the 90° (±45°) phase-shift system for the two-channel signal transmission referred to hereinbefore. The modulation system of the present invention is subject to negligible loss in signal-to-noise ratio in stereophonic or two-channel operation, while gaining appreciably in compatibility in monophonic or conventional A.M. reception over the modulation systems referred to.

It has also been found that in prior A.M. communication systems of the phase-shifted double-sideband type, exalted carrier operation at the signal receiving portion or means is difficult not only because of undesired phase and amplitude modulation of the exalted carrier, but because of variations in the signal strength of the carrier. Such variations in the exalted and received carriers may result in loss of proper channel separation between the two received channel signals.

It is, therefore, a further and important object of this invention, to provide an improved amplitude-modulated signal receiving system for phase-shifted double-sideband two-channel or stereophonic operations wherein automatic gain control of the received carrier is combined with automatic frequency control of the local oscillator and automatic phase control of the exalted carrier oscillator for improved stabilization of carrier amplitudes and full channel separation at alltimes.

In accordance with the invention, the transmitted signal for one channel is provided with double-sidebands shifted +30° from the final output or resultant carrier and the other channel is provided with double sidebands shifted −30° from the resultant carrier, the total angle between sidebands thus being approximately 60°, and not less than 50° as referred to hereinbefore with respect to the smaller phase-shift angles. Angles within this range result in relatively low harmonic distortion in conventional A.M. receivers. For full modulation of one audio channel with a pure tone or a single frequency, this is approximately 5.7% for 60° (±30°) between sidebands, and 2.9% for 50° (±25°) between sidebands. This compares with a relatively high harmonic distortion of approximately 16.3% for A.M. reception with the 90° (±45°) phase-shifted sidebands at full modulation as above.

Thus an improved stereophonic A.M. broadcast transmitter in accordance with the invention, operates to transmit phase-shifted, double-sideband, two channel A.M. signals that not only make for improved stereophonic reception in a stereophonic A.M. broadcast receiver of the present invention, but that also can be received with substantially no relative amplitude loss or degrading by a conventional A.M. receiver.

In the transmitter, simplified and effective circuits can be used for channel separation prior to modulation and for applying the proper modulation, and phase shift after modulation, to the signals. In the receiver, the exalted carrier type of operation can be used in an improved circuit and made effective for good channel separation and for deriving an exalted carrier free of phase and amplitude modulation to a degree that has not been realized with prior phase-shifted double-sideband A.M. systems for two-channel signal transmission.

The present system further involves phase locking an oscillator to an intermediate-frequency signal which may be derived by single-channel conventional A.M. receiver circuits. The output signal of the phase-locked oscillator is then used as an exalted carrier in two separated channels. The phase of this exalted carrier in one channel is shifted in one phase-shift network so that, when it is phase added to the received modulated IF signal carrier, the vector resultant thereof will be in phase quadrature to one pair of the double-sidebands. This results in the elimination, except the second harmonic, of the modulation or audio frequency signal represented in the one stereo channel by the sidebands which are in quadrature to the resultant carrier. The signal output of the other detector, due to the in-phase modulation component, becomes the audio frequency signal representing the other stereo channel.

To obtain the audio frequency signal representing the said one stereo channel, the exalted carrier in the other channel is shifted in phase in another phase-shift network in the opposite direction and phase added to the received modulated IF signal carrier to provide a vector resultant carrier in quadrature to the second set of sidebands, so that the output from the one detector due to the in-phase modulation component becomes the audio frequency signal representing the above first mentioned sidebands and the one stereo channel. By utilizing proper product detection, or by exalting the carrier to about 10 times the signal carrier with ordinary signal rectifiers, it has been found that the second harmonic, mentioned above, becomes negligible as will hereinafter appear.

The exalted-carrier locked oscillator is arranged to provide automatic frequency or phase control by feedback and phase adding the oscillator signal to the amplified IF signal carrier. Any differential signal output is rectified and applied as a D.-C. control voltage to maintain the phase of the locked oscillator fixed with respect to the signal carrier, and to provide automatic frequency control of the local mixer oscillator. This, together with effective AGC control in the RF, mixer and IF portions of the receiver, provides for maintaining the amplitude and phase of the received carrier wave substantially constant and stabilized. The detectors for the two stereo channels may then become simple diodes. However, pentagrid electronic tubes are presently preferred to effectively assure isolation of the exalted carrier from the modulated signal and to make cross-talk less dependent upon the constant amplitude of the exalted carrier.

The invention will further be understood, however, from the following description of certain preferred embodiments thereof, when considered in connection with the accompanying drawings, and its scope is pointed out in the appended claims.

In the drawings, FIGURES 1 and 2 are schematic block diagrams of the transmitter and receiver circuits respectively, of a phase-shifted, double-sideband, two-channel A.M. signal broadcast or communications system embodying the invention;

Figure 1:
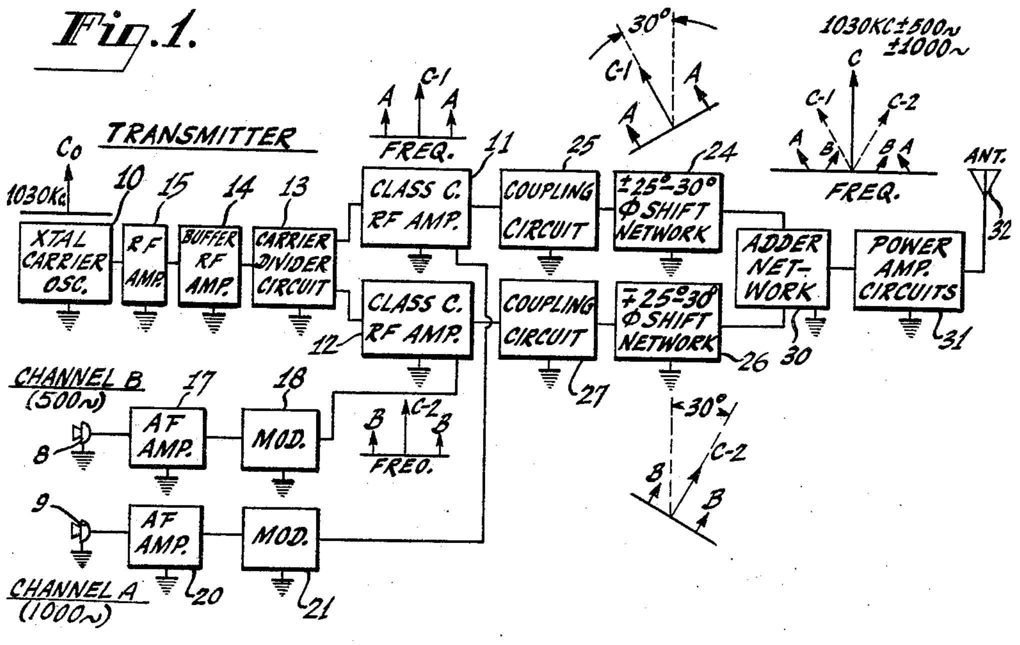

Referring to the drawings, in which like reference numerals are applied to like circuits and elements throughout the various figures, and referring particularly to FIGURE 1, at the transmitter two double-sideband signals, or carrier signal components, C–1 and C–2, shifted ±30° in phase and derived from an initial or basic carrier signal $C_0$, are provided with two-channel or stereophonic sound modulation applied at spaced microphones 8 and 9 for channels B and A, respectively. The carrier signal component for channel A, which in the present example is C–1, is shifted in phase +30° from the initial or basic carrier signal $C_0$ and the carrier signal component for channel B, which in the present example is C–2, is shifted in phase −30° from the initial carrier signal $C_0$. This is shown by the graphs associated with the circuit diagram of FIGURE 1 and representing the vector relations of the signals and sidebands at various stages along the transmitter circuit.

The two separate channel carrier signal components, C–1 and C–2, are derived from the same carrier source, such as a crystal-controlled carrier oscillator 10, and are separately modulated in class C RF amplifiers 11 and 12 respectively, which are coupled to the oscillator 10 through an RF branch or divider circuit 13, a buffer RF amplifier 14, and an RF amplifier 15. The carrier oscillator 10 may be considered, in the present example, to be tuned to a frequency of 1030 kc. in the A.M. broadcast band. Also, for a further understanding of the vector diagrams, the instant modulation signal applied to channel B at the microphone 8 may be considered to be a single tone at 500 cycles, and the instant modulation signal applied to channel A at the microphone 9 may be considered to be a single tone at 1000 cycles, in the present example.

The basic carrier signal $C_0$ from the crystal-controlled oscillator 10 is given a power step-up by the RF amplifier 15 to provide for effectively driving the class C RF amplifiers 11 and 12, and the buffer amplifier 14, interposed between the RF branch or divider circuit 13 and the RF amplifier 15, protects the oscillator 10 from feedback from the class C amplifiers.

In the present A.M. signal broadcast or communications system, as previously noted, both the channel A and the channel B signals are each on both sidebands of the transmitted carrier signal, that is, the transmitted signal is double-sideband signal for both transmission channels.

The modulating signal for channel B, derived through the microphone 8, is amplified in a suitable audio frequency amplifier 17 and is applied to a modulator stage 18 coupled between the amplifier 17 and the class C RF amplifier 12. The channel B modulation is thus amplified and applied to the carrier signal component C–2 in the amplifier 12 through the modulator stage 18.

Likewise, the channel A modulation is applied through the microphone 9, and a second audio frequency amplifier 20 to a modulator stage 21 coupled to the class C RF amplifier 11. Thus, the channel A modulation is applied to the second carrier signal component C–1 in the amplifier 11. The two carrier signals, with their sidebands, are indicated in the vector diagrams directly above and below the class C amplifiers in FIGURE 1. The vectors are drawn to indicate the channel A sidebands for the 1,000 cycle modulation of the carrier component C–1 and the channel B sidebands for the carrier component C–2 modulated at 500 cycles.

In accordance with the invention, two modulated carrier signal components are shifted in phase, one in a positive direction and one in a negative direction, whereby they are ±25° to 30° from the basic carrier signal $C_0$ supplied by the crystal oscillator 10. In the present example, the channel A carrier component C–1 is shifted +30° in a phase-shift network 24 which is connected through a coupling circuit 25 with the class C amplifier 11, and the channel B carrier component C–2 is shifted −30° in a phase-shift network 26 which is connected through a coupling circuit 27 with the class C amplifier 12. The two separated channel carrier components, C–1 and C–2, with their sidebands, are shifted substantially 60° apart although it is contemplated that the phase shift of each carrier may be provided at any angle of ±30°, or slightly more or less, as explained hereinbefore, for satisfactory results in the system of the present invention.

The relation of the phase-shifted carrier components, C–1 and C–2, and the sidebands is represented by composite vector diagrams directly above and below the phase shift networks in FIGURE 1 as referred to above. While these are not vector diagrams in the conventional sense, as hereinbefore considered, they are effective to show the operation of the system. Signal amplitude is the ordinate and frequency is the abscissa. The relative phase of the modulating vectors and the resultant carrier component are the angles with respect to the vertical which is taken as the resultant carrier phase.

The phase-shifted carrier components, C–1 and C–2, are added in a suitable adder network 30 which is coupled with both phase shift networks 24 and 26 to receive the signal output therefrom and to add the carrier signals vectorially. When these signals are combined, a resultant carrier signal C is provided, but the phase of the sidebands A—A and B—B remain at the original angles as shown in the further composite vector diagram above the network 30, with the sidebands phased ±30° with respect to the carrier C. This resultant signal is applied, through power amplifier circuits 31 coupled with the adder network 30, to a suitable transmitting antenna 32 from which it is radiated or broadcast for compatible reception by both standard monophonic A.M. receivers and two-channel or stereophonic A.M. receivers in accordance with the invention. The latter receivers will be considered in connection with the block crcuit diagram of FIGURE 2, to which attention is now directed.

A two-channel or stereophonic signal receiver for double-sideband amplitude-modulation operation, may be provided with single-channel signal input and initial translating circuits which are standard or conventional for single-channel or monophonic A.M. receivers, since the two-channel modulation is carried on a single composite carrier at a fixed frequency, which in this case is assumed to be 1030 kc. For this reason, the receiver, to which the double-sideband carrier, C, as shown in the graph, is applied, may comprise a tunable RF amplifier 35 tuned to the carrier frequency and connected to a suitable source of signal input energy, such as an antenna 36, a signal mixer 37 coupled to the RF amplifier 35 and to a local oscillator 38 for providing a resultant intermediate frequency signal, and an intermediate frequency amplifier 39 coupled between the signal mixer 37 and a second detector 40 as shown.

The audio frequency or second detector 40 of the conventional receiver may be used, in accordance with the invention, as a signal rectifier and as normally coupled to the IF amplifier, to provide a D.-C. component of the signal which may be utilized as an AGC (automatic gain control) potential for the preceding stages of the transmission channel, such as the RF amplifier 35, the mixer 37 and the IF amplifier 39. The AGC potential is conveyed from the detector 40 or, as it is presently used, the AGC rectifier, through an AGC supply circuit 41 to the various stages as referred to. The operation is such that the signal amplitude at the output end of the IF amplifier 39, or at an intermediate-frequency signal supply point 42 between the amplifier and the AGC rectifier 40, remains substantially constant with normal input signal amplitude variations.

The receiver system is of the type which operates in conjunction with an exalted-carrier oscillator 44, locked at the incoming signal frequency as derived from the IF amplifier. This may be considered to be at 455 kc. in the present example. This IF signal is applied to the exalted-carrier oscillator 44 through a series of coupling circuits 45 and 46 and a buffer or driver amplifier 48 which are effective to provide a strong exalted-carrier signal substantially devoid of any phase or amplitude modulation, whereby improved channel separation is attained.

At the output end of the intermediate-frequency amplifier 39, a relatively high impedance step-down is provided through the coupling circuit 45 which is connected between the intermediate-frequency amplifier and the buffer IF signal amplifier 48. The coupling connection between the impedance step-down circuit 45 and the buffer amplifier 48 is provided with a signal output circuit connection point indicated by the terminal 47 as hereinafter will be referred to, and the buffer amplifier 48 is loosely coupled with the exalted-carrier oscillator 44 through the circuit 46 which also provides signal phase shift. The IF signal conveying circuit between the buffer amplifier and the loose coupling or phase-shift circuit 46 is provided with signal output means, indicated by the terminal 49, for coupling to a combined AFC (automatic frequency control) and APC (automatic phase control) rectifier 50. The latter provides an oscillator-and-signal-responsive differential D.-C. control potential for application to the signal mixer oscillator 38 as an AFC potential, and to the exalted-carrier oscillator 44 as an AFC or, more strictly, an APC potential. The control circuit connections between the AFC-APC rectifier 50 and the two oscillators is indicated by the branched connection leads 51, 52 and 53.

As indicated by arrowed lines 55 and 56 respectively, the rectifier 50 is operated in response to a differential signal derived from the incoming IF signal and from the exalted-carrier oscillator signal fed back through the loose coupling circuit 46. This control circuit tends to stabilize the IF signal output by controlling the operation of the mixer oscillator 38 by AFC action, and, at the same time, controls the phase of the exalted carrier oscillator 44, whereby the latter locks and remains locked with the IF signal derived through the low-impedance coupling with the IF amplifier.

While both oscillators are controlled in frequency (AFC) by the rectifier output voltage, the local or mixer oscillator is varied in frequency over a range of many cycles, that is, more than one, as a true AFC controlled device, whereas the exalted-carrier oscillator is varied over a range of less than one cycle, while locked with the incoming signal, and is, therefore, more strictly a phase-controlled device. Hence, the rectifier 50 is a combined frequency and phase-control rectifier for the receiving system.

Any variation in the phase relation between the exalted carrier and the IF signal at the terminal means 49, either by variation of the frequency of the IF signal or of the exalted carrier oscillations, results in a differential output signal at the terminal means 49 which is applied to the AFC rectifier 50 and provides a corresponding differential D.-C. control potential for APC control of the exalted-carrier oscillator and AFC control of the signal-mixer oscillator.

The exalted-carrier signal derived from the oscillator 44 is devoid of phase and amplitude modulation by reason of the loose coupling and the low impedance circuits interposed between the oscillator and the carrier signal source, and also because of the effective automatic frequency and phase control voltage derived from the rectifier 50 which is differentially supplied by the IF signal and the exalted-carrier signal, as above described.

At this point in the system, channel separation is provided by two branch coupling circuits 59 and 60 interposed between the oscillator 44 and the respective channel phase-shift networks 61 and 62, the network 61 being provided for channel A and the network 62 being provided for channel B. Each channel is provided with a suitable converter or detector coupled to the phase-shift network, the converter for channel A being indicated at 64 and the converter for channel B being indicated at 65. These are coupled respectively to the phase-shift networks 61 and 62 and in turn are coupled respectively to suitable audio-frequency amplifiers 66 and 67. Loudspeaker or speaker networks 68 and 69 are provided for sound reproduction from the respective channels A and B and are coupled to the respective amplifiers 66 and 67 as shown.

The converters or detectors 64 and 65 for channels A and B are product detector devices for the exalted carrier and received signals, and effective channel separation is provided therein through proper adjustment of the signal phase relations under control of the phase shift networks 61 and 62. The incoming modulated signal at the intermediate frequency is derived from the signal translation circuit at the signal supply point 47, between the buffer amplifier 48 and the impedance stepdown circuit 45, through a supply or injector circuit 70 terminating in each of the converter detectors 64 and 65 as shown. It may be noted that by this connection the detectors are isolated from the intermediate-frequency amplifier 39 by the impedance-stepdown circuit 45 and are thus supplied with the modulated IF carrier signal at low impedance. This carrier-signal supply connection to the detectors is also isolated from the exalted-carrier oscillator 44 by both the buffer amplifier 48 and the loose-coupling circuit 46. This circuit arrangement aids in providing effective channel separation which will now briefly be described.

Figures 2, 4A, 4B:
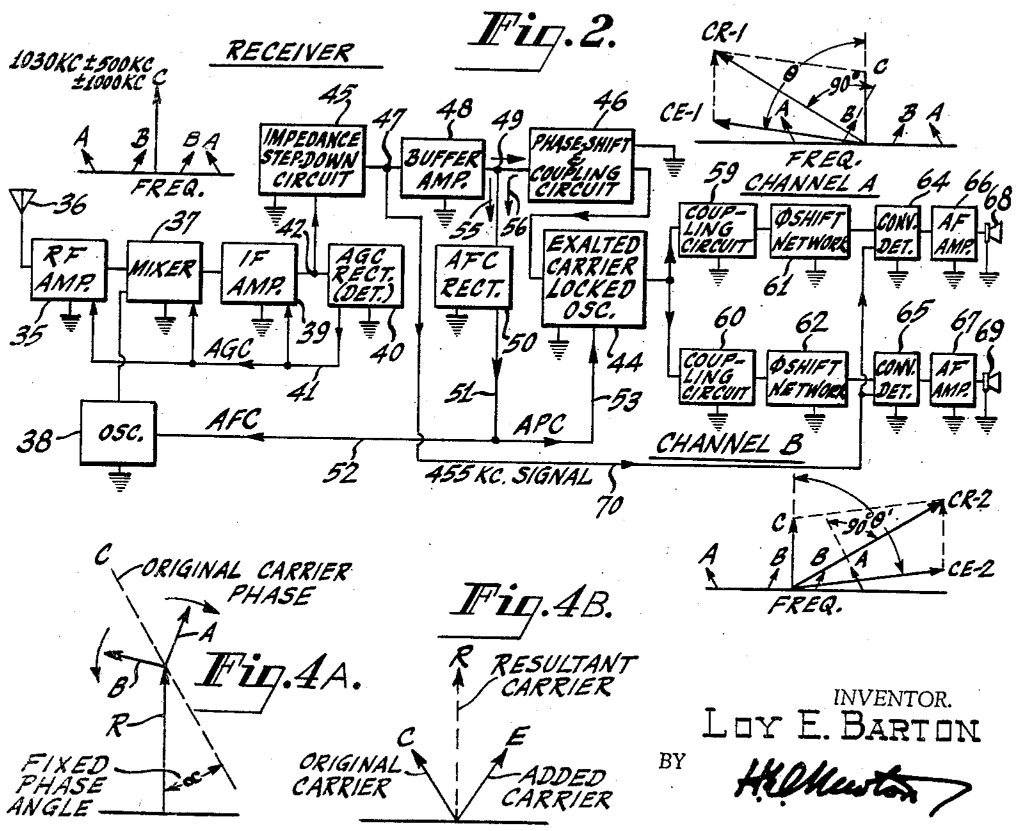
FIGURES 4A and 4B are vector diagram graphs showing the relative phase of certain signal components in the system of the present invention.

Referring to the vector diagram above channel A in FIGURE 2, which depicts the case of diode detection, the exalted-carrier signal component CE–1, derived through the coupling circuit 59, is shifted in phase in a positive direction with respect to the received carrier C by an angle $\theta$ which is of a value to bring the vector resultant component CR–1 at an angle of 90° or in quadrature to the unwanted modulation, which in this case are the sidebands B—B as indicated in the vector diagram. The channel B modulation in quadrature phase with the resultant carrier CR–1 is substantially zero while the channel A modulation has a substantial vector in phase with this resultant carrier. This component is rectified and appears in the channel A output amplifier 66 and speaker system 68 as the channel A signal.

Likewise in channel B, for the case of diode detection, the exalted-carrier signal component CE–2, derived from the oscillator 44 through the coupling circuit 60, is shifted in phase in a negative direction with respect to the received carrier C by an angle of $\theta'$, as shown in the vector diagram below channel B in FIGURE 2, such that the vector resultant CR–2 is at an angle of 90° or in quadrature to the unwanted channel A modulation. Thus, the carrier CR–2 applied to the detector 65 carries no channel A modulation. A substantial vector component of the channel B modulation is in phase therewith, and this vector component is detected and applied to the speaker system 69 through the amplifier 67 for the channel B signal output.

It will be seen, with reference to the above vector diagrams, that the phase shift provided by the networks 61 and 62 must be maintained substantially fixed in order to maintain complete channel separation, that is, elimination of unwanted cross modulation in each channel. It will also be seen that the vector resultant carriers CR–1 and CR–2 are also dependent upon the amplitude of the carrier C, and upon the amplitudes of the exalted-carrier signals, CE–1 and CE–2, for maintaining the exact 90° angular relation to the unwanted modulation component in each channel. Therefore, it will be seen that both the AGC control of the incoming modulated carrier as provided in the receiver circuit, and the AFC and automatic phase control also as provided in the receiver circuit, are important in maintaining these signal amplitudes substantially constant.

Figure 3:
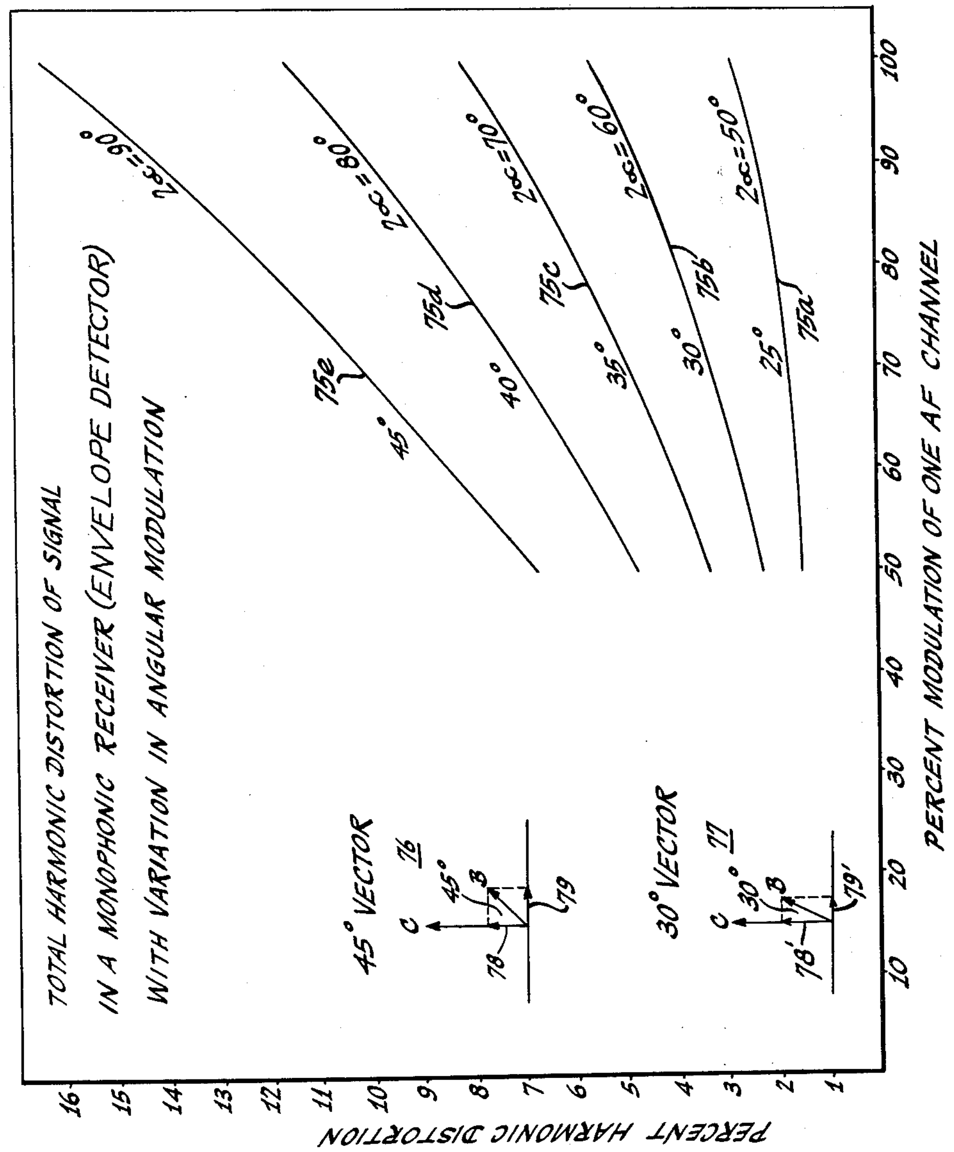
FIGURE 3 is a graph showing curves for comparing an operating characteristic of the commnications system of the present invention with others.

Referring now to FIGURE 3, a series of curves, *75a* through *75e* in the graph, are plotted between coordinates, as shown, to indicate the percent harmonic distortion of a signal in a monophonic receiver including an envelope detector, with various degrees of angular modulation from ±25°, as shown by the curve *75a*, to ±45° as shown by the curve *75e*.

Referring particularly to the curve *75e*, it will be seen that the percent harmonic distortion for 90° phase-shifted (±45°) double-sideband signals in a monophonic receiver on one AF channel may vary from 7% to over 16%, and is thus undesirably high. With phase angles with respect to the carrier of less than ±45°, such as ±30° for example, in accordance with the present invention, it will be seen from the curve **75*b*** that the percent harmonic distortion may be as low as slightly over 2% for 50% modulation and less than 6% with 100% modulation. Thus it is within an acceptable range for compatible monophonic reception.

Further comparing the 90° (±45°) system with the 60° (±30°) system and the distortion curves **75*e* and 75*b* respectively, the vector diagrams 76 and 77, respectively, in the graph of FIGURE 3 may now be referred to. Considering one AF channel, such as channel B in the vector diagram 76, the modulation is shown at a 45° angle to the carrier C. The component 78 of the modulation in phase with the carrier is equal to the component 79 of the modulation in quadrature to the carrier. While the latter component is at 90°, or in quadrature, with respect to the carrier, it contributes to the harmonic distortion of the envelope of the transmitted signal. It is equal to the desired signal component since 78 and 79** are equal, and is 70% of the modulation amplitude.

Referring to the vector diagram 77, and using the B channel modulation as an example in this case also, the modulation is shown at the 30° angle to the carrier C. Now the in-phase component 78′ is much larger than the quadrature component 79′. In this case the in-phase component is over 86% of the modulation amplitude, while the quadrature component, which contributes to the harmonic distortion of the envelope, may be only 50% of the modulation amplitude, resulting in a reduction of the harmonic distortion, and in the transmission of a more compatible signal.

Thus it will be seen that the ±30° phase-shift provides a greatly reduced harmonic distortion as compared with the ±45° phase-shift, for two-channel or stereophonic signal transmission and reception. With the ±45° phase-shift, both the signal component and the quadrature component are of the same strength, whereas with the ±30° phase-shift the quadrature component is appreciably reduced and thereby an appreciable reduction in the harmonic distortion in monophonic reception is attained. The smaller ±30° angle therefore produces a more compatible signal for conventional A.M. receiver operation. Because of the large number conventional A.M. receivers in use, this is of importance in providing a commercially practical stereophonic or two-channel A.M. signal transmission and reception system.

It should be noted, with reference to the vector diagrams considered herein which show the relative phase of a carrier signal wave and its sideband components, that in a strictly technical sense this phase relation is a time varying function. This has been pointed out hereinbefore. However, the vector diagrams of FIGURES 4A and 4B may briefly be considered to further clarify what is meant by the phase angle between the carrier and sidebands as used herein.

The process of amplitude modulation of a carrier signal can be represented by the addition, to the original carrier signal vector C, of a pair of vectors, A and B, counter rotating at the audio modulation frequency. The counter rotating vectors may be resolved into component vectors in phase and in quadrature with the original carrier signal vector. The quadrature components cancel while the in-phase components add. If a signal component E at the carrier signal frequency but differing in phase from the original carrier signal is added to this amplitude-modulated signal, the resultant carrier component R will bear some fixed phase relation $\alpha$ to the original carrier phase, along which the counter rotating modulation vectors A and B add. It is this angle $\alpha$ which is considered as the relative angle of the sidebands to the carrier signal.

The transmitter system, shown and described in connection with FIGURE 1, is provided with additional circuit features, in accordance with the invention, which are shown more in detail in the circuit diagram of FIGURE 5, to which attention is now directed, along with FIGURE 1.

Figure 5:
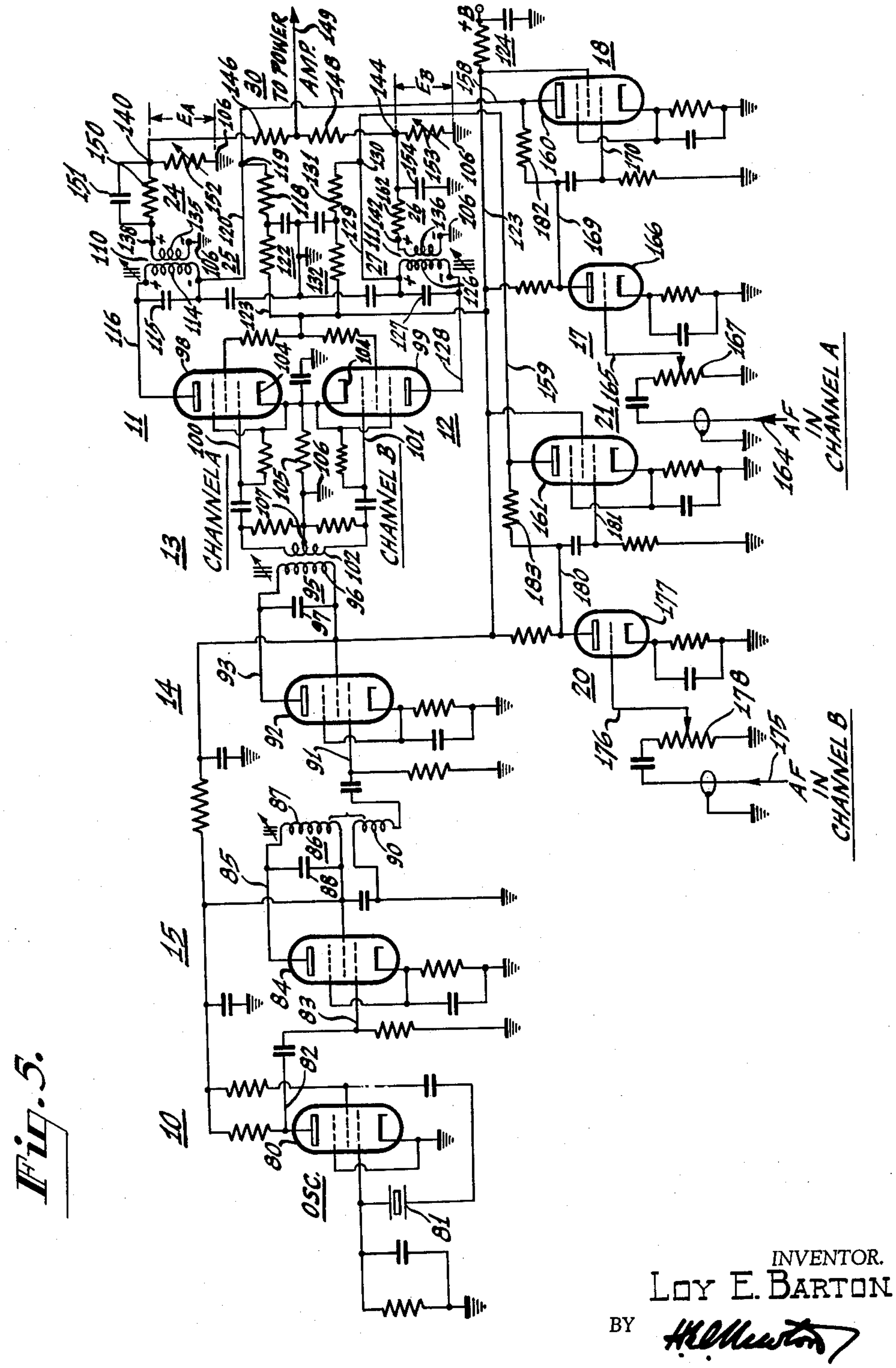
FIGURE 5 is a schematic circuit diagram showing detailed circuitry of the transmitter block diagram of FIGURE 1 as provided in accordance with the invention.

In FIGURE 5, the main circuit elements comprising the carrier source or oscillator 10, the RF amplifier 15, and the buffer amplifier 14, may be provided by a series of cascade connected electronic-tube stages or circuits, as shown, in which the oscillator is provided with an electronic tube 80 controlled in frequency by a crystal unit 81 and coupled through an output circuit 82 to the input grid circuit 83 of an RF amplifier 84. The output anode circuit 85 of the RF amplifier tube 84 includes a tuned circuit 86 comprising a variable inductor or coupling winding 87 and a fixed shunt tuning capacitor 88. The circuit 86 is tuned to the oscillator frequency which, in the present example, is assumed to be the selected carrier frequency of 1030 kc.

The buffer amplifier 14 is coupled to the tuned output circuit 86 of the RF amplifier 15 in a stepdown ratio as provided by a small coupling winding 90 inductively coupled to the larger winding or inductor 87 and connected in the input grid circuit 91 of an electronic amplifier tube 92 in the buffer amplifier 14. The output anode circuit 93 of the amplifier tube 92 includes a tuned circuit 95 comprising an inductively variable coupling winding 96 and a shunt tuned capacitor 97. The circuit 95, like the circuit 86, is tuned to the selected basic carrier frequency provided by the oscillator 10. The oscillator 10, the RF amplifier 15 and the buffer amplifier 14 represent any suitable circuit means for performing the functions referred to, and provide a strong amplified carrier signal at the tuned output circuit 95 for driving the the class C RF amplifiers 11 and 12. The stepdown transformer coupling 87—90 and the buffer amplifier 14 serve to prevent feedback coupling from the class C amplifiers to the oscillator 10 which would adversely affect its frequency response and stability.

As in any two-channel transmitter, there is the problem of providing channel separation and two carriers of equal amplitude, properly phase-shifted with respect to the basic carrier. This problem is solved, in accordance with the invention, by providing the phase-shift, after channel modulation, at the signal output side of the class C amplifiers, rather than at the input side and along with the channel separation as in prior proposed two-channel signal transmission systems.

Referring to the class C amplifiers 11 and 12 for channels A and B respectively, screen-grid electronic amplifier tubes 98 and 99 are provided in the respective amplifier stages, and are connected for push-pull operation of their signal input circuits 100 and 101, respectively, through a center-tapped input coupling winding 102 which is inductively coupled with the winding 96 of the tuned output circuit 95 of the buffer amplifier 14. The cathodes 104 of the amplifier tubes 98 and 99 are connected through a common bypassed cathode resistor 105 with system ground 106 and with the center tap terminal 107 of the push-pull input coupling winding 102.

The inductively coupled windings 102 and 96 provide a push-pull input transformer for the amplifiers 11 and 12, having a tuned primary winding and a center-tapped secondary winding to which the input circuits of the amplifiers are connected in push-pull or balanced relation. Push-pull input coupling for channel separation at the class C amplifiers is advantageous because these amplifiers normally draw heavy grid current and normally provide an appreciable load on the driver circuit or stage, such as the buffer amplifier 14. With a push-pull transformer or balanced input circuit, only one half of the input circuit draws full grid current at any one time and therefore the load on the buffer amplifier or driver stage is distributed over the cycle more than if the two class C amplifiers were connected in parallel at the input circuits, as they would be normally, with the phase-shift networks also in the input circuits. In other words, by placing the phase-shift networks 24 and 26 at the output ends of the class C amplifiers, the input circuits may be arranged in push-pull or balanced relation for channel separation and to reduce the load effect on the driver stage as above noted.

Since the two channels A and B operate in push-pull relation or 180° out-of-phase with each other, a later phase reversal in one channel must be provided, as at one of the output coupling circuits for the class C amplifiers. As preferred means for this purpose, transformer coupling is provided in these circuits, whereby the circuit connections to one winding may be reversed to attain the desired in-phase relation between the two separated channel carriers or carrier components. In the present example, a stepdown output transformer 110 is provided for channel A and a similar stepdown output transformer 111 is provided for channel B. The transformer 110 comprises an inductively variable primary winding 114 which is tuned by a shunt fixed capacitor 115 and connected in the output anode circuit 116 of the channel A amplifier tube 98. Anode operating current for the tube 98 is supplied through a series modulating impedance means or resistor 118, the output terminal 119 of which is connected to the low signal potential terminal of the primary winding 114 through a lead 120. A its input end the series resistor 118 is connected through a low-pass filter network 122 to an anode voltage supply lead 123. The latter is connected with the system +B supply terminal through a second filter network 124 as shown.

Likewise, the output coupling transformer 111 comprises an inductively-variable primary winding 126 which is tuned with a shunt fixed tuning capacitor 127 and connected in the output anode circuit 128 of the channel B amplifier tube 99. The low signal potential terminal of the primary winding 126 is connected through a lead 129 with the output terminal 130 of a series modulating impedance means or resistor 131 similar to the resistor 118. The resistor 131 is connected through a low-pass filter network 132 with the anode voltage supply lead 123 for receiving operating current from the system +B terminal, like the anode circuit for the tube 98.

Each of the primary windings 114 and 126 are tuned to the common or basic carrier frequency and are coupled respectively to secondary windings 135 and 136, each of which are connected at one terminal to system ground 106. The ungrounded or high signal potential terminal 138 of the secondary winding 135 is connected through the phase-shift network 24 to a signal output terminal 140 for channel A, and the ungrounded or high signal potential terminal 142 of the secondary winding 136 is connected through the phase-shift network 26 with an output terminal 144 for channel B. The instantaneous polarities of the transformer windings is indicated by the polarity marks opposite the terminals thereof.

It will be seen that the connections for the anode output circuit 128 for channel B with the primary winding 126 is reversed with respect to the connection of the output circuit 116 for channel A with the primary winding 114. Thus, the 180° out-of-phase relation of the two separate channels through the class C amplifiers is restored to in-phase, and the carrier signal components conveyed thereby are brought into in-phase relation by the 180° phase shift at the primary winding 126. The carrier signal voltages at the secondary windings 135 and 136 are thus in-phase with each other and may be properly phase-shifted in the networks 24 and 26 to provide the desired ±30° relation to the basic carrier, as represented in the vector diagrams of FIGURE 1.

At the output terminals 140 and 144, the two signal voltages or carrier components C–1 and C–2 respectively, with the sidebands, are provided in equal amplitude and in balanced relation. The balanced output signal voltages are indicated in the circuit diagram at $E_A$ and $E_B$. The composite or resultant carrier, with both sets of sidebands, is derived through a simple adder network comprising two series decoupling resistors 146 and 148, or like impedance means connected between the terminals 140 and 144, respectively, and a common output circuit 149 leading to the usual output amplifier circuits as shown in FIGURE 1.

In the present example, the phase-shift network 24 for channel A comprises a series resistor element 150 connected between the secondary terminal 138 and the channel output terminal 140 and provided with a shunt capacitor element 151. A variable control resistor 152 connected between the terminal 140 and system ground provides means for adjusting the signal output voltage from the network, at the terminal 140, in amplitude and phase.

The phase-shift network 26 for channel B is a similar resistance-capacitance network comprising a series resistor element 162 connected between the secondary terminal 142 and the channel output terminal 144, and a variable resistor element 153, with a shunt capacitor element 154 therefor, connected between the terminal 144 and system ground 106. The circuit elements of the phase-shift networks 24 and 26 are adjusted and so related that the desired 60° (±30°) phase relation exists between the two carrier components C–1 and C–2 at the output terminals 140 and 144, respectively, subject to adjustment by the variable resistor elements 152 and 153 in the networks.

From the foregoing description, it will be seen that the transmitter provides a carrier signal of constant frequency which is suitably amplified for driving the class C amplifier in each signal channel after channel separation. Simplified division of the RF signal is provided by means of push-pull transformer coupling between the single-ended buffer amplifier output circuit and the dual balanced input circuits of the class C channel amplifiers. This effectively reduces the loading and the power requirements for driving the amplifiers. By using coupling transformers in the output circuits of the class C amplifiers, phase reversal is made possible in one channel by merely reversing the transformer connections for one winding, such as the channel B primary winding in the present example. The two separated signal components or carriers are then in-phase and can be shifted with respect to each other 60° or ±30° from the mean or basic carrier. The phase-shift networks then serve to adjust the angularity between the separated carriers substantially +30° in the one channel and —30° in the other channel. The two signals are applied to the resistance-capacitance phase-shift networks from identical signal sources provided by the secondary windings of the coupling transformers, and the resistive control device in each network provides balance means to equalize the signal or carrier output from both channels.

Amplitude modulation is applied to each of the separated signal components or carriers by the usual plate or anode circuit modulation, although other methods may be used. In the present example, the anode circuit coupling impedance means or resistors 118 and 131 are connected in common with the anode circuits of the class C amplifiers 98 and 99 and with the anode circuits 158 and 159 of electronic modulator tubes 160 and 161, respectively, for the channel A and B modulators 18 and 21. Incoming signal modulation for channel A, as provided by a source such as the microphone 9 of FIGURE 1, is received through a shielded supply lead 164 and applied to the input grid circuit 165 of an electronic amplifier tube 166, in the audio-frequency amplifier 17, through a variable gain control device 167. The output anode circuit 169 of the amplifier tube 166 is coupled to the input grid circuit 170 of the modulator tube 160 thereby to modulate the plate current in the anode circuit 158 and in the common coupling impedance means 118, whereby the modulation is applied to the anode circuit 116 of the class C amplifier 98. Thus, the modulation is applied to the channel A carrier component C–1 and appears as a modulated signal at the terminal 140 for combining in the output circuit 149 with the corresponding signal from channel B.

In channel B, the incoming audio frequency signal, as provided by a source such as the microphone 8 of FIGURE 1, is received through a shielded input lead 175 and applied to the input grid circuit 176 of an audio-frequency electronic amplifier tube 177, in the audio-frequency amplifier 20, through a variable gain control device 178. The output anode circuit 180 of the amplifier tube 177 is coupled to the input grid circuit 181 of the modulator tube 161 to provide modulation of the anode current in the output circuit 159 and in the common coupling impedance means 131, whereby the modulation is applied to the anode circuit 128 of the class C amplifier tube 99. This results in modulation of the carrier component C–2 for channel B which is derived from the terminal 144 and applied to the output circuit 149. The gain control devices 167 and 178 are provided for adjusting the modulation amplitude in each channel and for balance, and may be provided by any other suitable means. Each of the modulators 18 and 21 are provided with feedback circuits represented by the resistors 182 and 183 respectively in connection with the amplifier tubes 160 and 161.

From the foregoing description, it will be seen that anode or operating current for channel A and B modulation is supplied through the smoothing filter networks 122 and 132 and the common modulation coupling resistors 118 and 131 to the terminals 119 and 130 which provide common connection points or terminals for the respective channel A and channel B class C amplifier and modulator anode circuits. By this simple circuit arrangement, effective plate modulation is applied to each of the output signal or carrier components C–1 and C–2. Each channel may provide up to half of the modulation on the combined output circuit 149.

Figure 6:
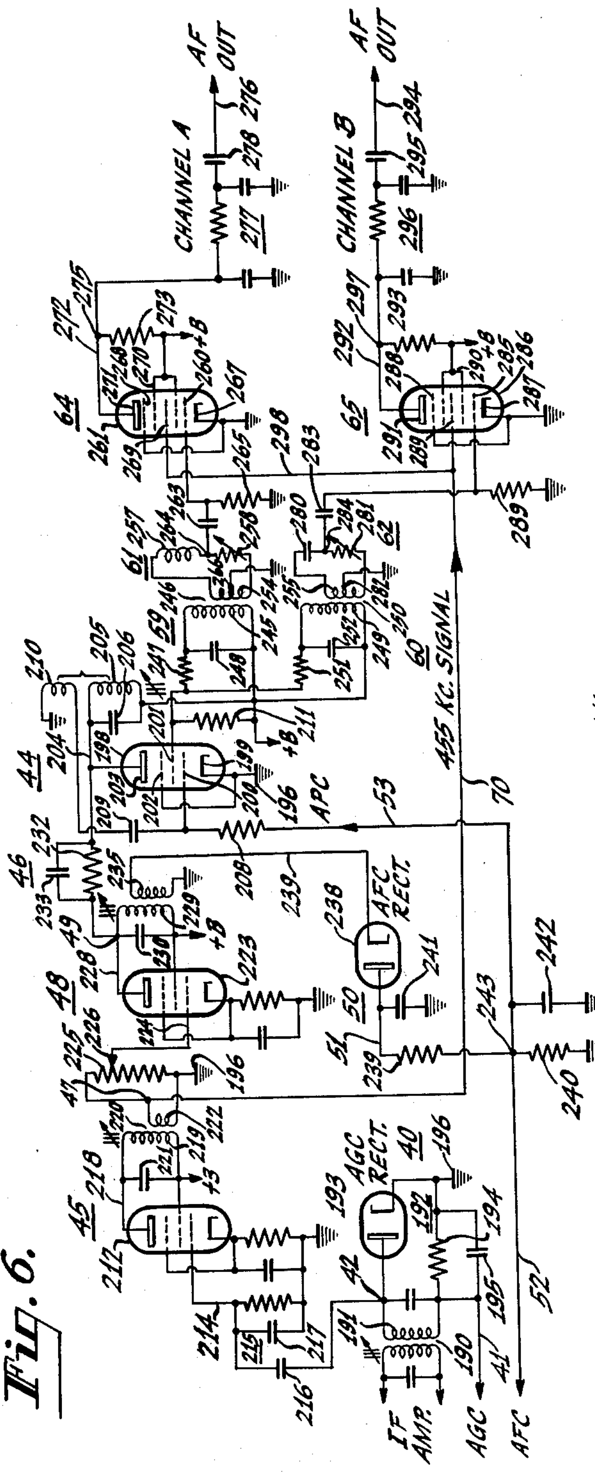
FIGURE 6 is a schematic circuit diagram showing detailed circuitry of the receiver block diagram of FIGURE 2 as provided in accordance with the invention.

Referring now to FIGURE 6 and a more detailed consideration of the receiver system and circuits as constructed in accordance with the invention, it has been seen that the receiver system involves phase locking an oscillator to a received intermediate frequency signal that may be derived through standard A.M. receiver circuits. The output signal of the oscillator is then used as an exalted carrier in the signal separation circuits which follow. The exalted-carrier signal, devoid of any phase or amplitude modulation, is applied through two separate signal channels and phase-shift networks to diode or other suitable channel detector circuits wherein is added the received modulated intermediate-frequency signal or carrier. The phase of the exalted carrier is adjusted in each channel by the phase-shift network so that when added to the received signal, the resultant carrier will be at a right angle or in quadrature to the undesired double sideband signal for that channel. The desired double sideband signal, having components in phase with the carrier, is then detected, amplified and reproduced by the channel output speaker means.

The receiver input signal translating circuits through the intermediate frequency amplifier may be conventional receiver circuits as referred to in the description of FIGURE 2. The last IF amplifier circuit of the receiver is represented by a tuned output or coupling transformer 190, the secondary 191 of which is connected with the IF signal supply point or terminal 42 as referred to in the description of FIGURE 1. The AGC rectifier 40 may be a simple second detector or like signal rectifying circuit 192, comprising a diode rectifier tube 193 connected on one side with a diode output load resistor 194 having the usual signal bypass capacitor 195 and on the other side with the intermediate frequency signal supply point 42. Chassis or common ground 196 for the receiver circuits is connected with the rectifier circuit at the junction of the rectifier and the output resistor 194. The opposite end of the resistor is connected with the secondary 191, and with the automatic-gain-control (AGC) supply circuit 41 for the preceding signal amplifying circuits of the A.M. signal receiver, as indicated in FIGURE 2.

The rectified or D.-C. component of a received IF signal which appears across the resistor 194 as the result of a received signal, is applied between receiver ground and the AGC supply circuit 41. By reason of the resulting AGC action in the receiver, the signal amplitude at the output end of the IF amplifier, that is, at the signal supply point 42, remains substantially constant with normal input signal amplitude variations. This is important because for stable operation of the exalted-carrier oscillator and for effective signal separation, the IF output signal must remain substantially constant. The usual rectifier type of second or audio detector of the receiver, as shown, may be utilized for this purpose, although the audio signal is not utilized for further amplification.

The exalted-carrier oscillator 44 of the present example, which is driven by and locked with the incoming IF signal at the terminal 42, comprises an electronic tube 198, of the screen-grid type, having a cathode 199 connected to the common ground 196, a control grid 200, a screen grid 201, a suppressor grid 202 connected with the cathode, and an anode or plate electrode 203. While this type of tube is presently preferred for reasons which will appear, it is possible that other types of electronic oscillator devices may be used.

In the present case, the anode is connected with a tuned output circuit 204 provided with a variable tuning winding or inductor 205 and a shunt tuning capacitor 206 therefor. The control grid 200 is connected with the automatic-phase-control (APC) supply lead 53 through a grid resistor 208 and is also coupled through a capacitor 209 with a feedback winding 210 having a return connection with receiver ground. The feedback winding is inductively coupled with the anode circuit tuning inductor 205 and poled to provide positive feedback to the grid for sustaining oscillations at the frequency of the tuned circuit provided by the inductor 205 and the capacitor 206. The frequency is adjusted to that of the intermediate frequency signal (455 kc.) from the IF amplifier at the supply terminal 42. The screen grid 201 is also connected through a load resistor 211 with the operating voltage supply source B+.

As described in connection with the circuit of FIGURE 2, the received intermediate-frequency signal at the output end of the intermediate-frequency amplifier, as at the terminal 42, is applied to the exalted carrier oscillator 44 through a series of amplifiers and coupling circuits 45, 46 and 48. The coupling circuit 45 provides an impedance stepdown from the high impedance of the tuned output circuit of the intermediate-frequency amplifier and provides a low-impedance signal source for driving both the exalted-carrier oscillator and the channel signal separator or detector circuits 64 and 65.

In the present example, the impedance stepdown coupling circuit 45 includes an electronic amplifier tube 212, of the screen-grid type, having a signal input circuit 214 connected through a capacitive voltage-divider network 215 with the intermediate frequency signal supply terminal 42. By proper relation of the capacity values of two series capacitor elements 216 and 217 in the network 215, the signal applied to the input circuit 214 may be reduced to an amplitude which, after further signal translation in the buffer amplifier, is suitable for driving the oscillator 44. On the output side of the coupling circuit 45, the output anode circuit 218 of the coupling tube 212 is tuned to the intermediate frequency by a tuning inductor 219, which is the primary winding of a stepdown coupling or impedance changing transformer 220, and a suitable shunt tuning capacitor 221 therefor. The secondary winding 222 of the transformer is of low-impedance and connected between ground 196 and the low-impedance signal output circuit connection point or terminal 47. The transformer coupling may provide an impedance stepdown from the primary winding 219 of as much as 50:1 to supply the controlling IF signal to the exalted-carrier oscillator and to inject it into the channel detectors from the supply point 47 at a very low impedance, as is desirable to prevent feedback to the IF source.

The IF signal is applied to the exalted-carrier oscillator from the low-impedance supply connection 47 through the buffer amplifier 48 which further decouples the oscillator to prevent feedback. This amplifier comprises an electronic amplifier tube 223 having a signal input circuit 224 connected with the low-impedance supply terminal 47 through a variable gain-control device such as a potentiometer resistor 225 having a variable tap or contact 226. With this circuit arrangement, the potentiometer resistor 225 is connected in shunt relation to the low-impedance IF signal supply circuit and the movable contact 226 is connected with the input circuit 224, thereby to further control or adjust the signal amplitude of the IF locking signal for the exalted-carrier oscillator 44 to a proper value.

The IF signal output means, indicated by the terminal 49, for coupling the AFC rectifier 50 to the buffer amplifier and the oscillator 44, as hereinbefore referred to, is provided on the high signal potential side of an output anode circuit 228 for the buffer amplifier tube 223. This circuit includes a variable tuning inductor 229 and a shunt tuning capacitor 230 for tuning to the IF signal frequency.

The exalted-carrier oscillator 44 is coupled to the tuned output circuit 228 of the buffer amplifier at the high signal potential terminal 49 through the circuit 46 which comprises a series resistor 232 and a shunt capacitor 233 therefor connected from said terminal to the tuned anode circuit 204 of the exalted-carrier oscillator. The tuned output anode circuit 228 of the buffer amplifier 48 and the tuned anode circuit 204 of the exalted-carrier oscillator 44 are thus connected substantially in parallel relation to each other through an effectively loose coupling circuit provided by the series resistor 232, and the normal phase relation of the oscillator and IF signals is determined by the relative impedance values of the resistor 232 and the shunt capacitor 233. The coupling is sufficient to hold the oscillator locked to the IF signal frequency and in proper phase relation thereto with a relatively low amplitude IF signal. Any variation in this phase relation, either by variation of the frequency of the IF signal or of the exalted-carrier oscillations, results in a differential output signal at the terminal 49 and across the tuned output anode circuit 228 of the buffer amplifier.

The differential output signal is applied to the AFC rectifier 50 through a coupling winding 235 inductively coupled with the tuning winding 229. The winding 235 is thus effectively coupled with the signal supply point or terminal 49 and receives any differential signal applied to said terminal from the buffer amplifier forwardly, and from the exalted-carrier oscillator by feedback through the loose coupling circuit 46. The AFC rectifier 50 may comprise a simple diode rectifier, represented by the electronic tube 238, having a signal input circuit 239 in which the coupling winding 235 is connected, as shown, between the rectifier and system ground. The output circuit 51 of the AFC rectifier 50 is connected with the AFC and APC supply leads 52 and 53, respectively for the mixer oscillator and the exalted carrier oscillator as hereinbefore described, through a resistive voltage divider network comprising two series resistors 239 and 240 provided with RF bypass capacitors 241 and 242, respectively. The supply leads 52 and 53 are connected at a terminal 243 which is at the junction of the two resistors. With this circuit arrangement, a differential D.-C. control potential is derived through the rectifier 50 and applied to the local and exalted-carrier oscillators from the output terminal 243. This connection is highly filtered by the resistor-capacitor network.

The APC connection through the supply lead 53 is such that the differential D.-C. voltage at the terminal 243 is applied to the control grid 200 of the oscillator tube 198 through the grid resistor 208 and increases in a negative direction with increase in the differential signal to apply a correction to the exalted-carrier oscillator for any phase differential signal between the two 455 kc. signals which appears at the terminal 49. This action is considerably aided by the AFC control of the local oscillator by the differential signal rectifier 50 since this is coupled to both the receiver oscillator, which determines the IF signal, and the exalted carrier oscillator. The variable differential D.-C. output voltage from the diode rectifier 238 is poled to correct for the phase error between the two 455 kc. signals as above mentioned and to supply the AFC control of the local oscillator in the mixer circuit of the receiver. If the IF signal and the locked-oscillator signal tend to differ in phase, the diode output voltage changes in magnitude to correct for the change. The bias on the signal grid 200 of the exalted-carrier oscillator is varied by this voltage to correct the tuning response of the oscillator.

The low-impedance coupling with the IF amplifier and the loose coupling between the buffer amplifier circuit and the exalted-carrier oscillator tends to provide a carrier that is substantially free of amplitude and phase modulation. The dual control of the exalted carrier and local oscillators further aids in providing stabilized operation of the system for effective channel separation.

As a further aid in providing a clean exalted-carrier signal, the exalted-carrier oscillator is also effectively loose coupled to the channel separation circuits which follow. Normally, channel separation would be provided in connection with the oscillator anode circuit by coupling two branch circuits thereto in parallel relation. In the present example and as a preferred embodiment, the branch or channel separator circuits 59 and 60, which are interposed between the oscillator 44 and the respective channel phase-shift networks 61 and 62, are coupled to the screen grid circuit of the oscillator tube 198 in parallel with the screen grid supply resistor 211 as the common signal source. This may have a relatively low resistive or impedance value such as 4700 ohms with an oscillator tube 198 of the type known commercially as a 6AU6, for example.

The coupling circuit 59 for channel A comprises a primary winding 245 of a stepdown coupling transformer 246 connected with the end terminals of the screen grid resistor 211, through a series isolating resistor 247. A shunt tuning capacitor 248 in parallel with the winding 245 serves to tune it to the exalted carrier output frequency. Likewise, for channel B, a primary winding 249 of a coupling transformer 250 is connected with the terminals of the screen-grid resistor 211 through a second series isolating resistor 251, and is likewise tuned to the exalted carrier output frequency by a shunt tuning capacitor 252. The isolating resistors may have a relatively low resistance value in the circuit of the present example, of 6700 ohms, whereby the circuits are independently tunable.

The transformers 246 and 250 are provided respectively with low-impedance tapped secondary windings 254 and 255 which are connected into the respective phase-shift networks 61 and 62. The phase-shift network 61 comprises an inductor 257 and a series variable resistor 258 connected in series between the terminals of the secondary winding 254. This is connected to provide variable inductive reactance in the network between the secondary winding and a first signal input grid 260 of an electronic converter or detector tube 261 in the detector 64 for channel A. The signal input grid 260 is connected for this purpose through a coupling capacitor 263 to a terminal 264 at the junction of the resistor 258 and the inductor 257. The grid 260 is also provided with a bias supply connection through a grid resistor 265 connected to chassis or ground for the receiver. A tap connection 266 on the secondary 254 to chassis or ground completes the coupling circuit through the phase-shift network.

The converter or detector tube 261 is of the penta grid type and further having a cathode 267 connected to chassis or ground and to a suppressor grid 268, a second signal input grid 269 which is provided with a screen grid 270, and an output anode 271. The latter is connected with an output circuit 272 in which is connected an output coupling or load resistor 273 for supplying anode current thereto and for output coupling. The high signal potential end or terminal 275 of the coupling resistor 273 is connected to an output circuit lead 276 through a low-pass filter 277 and a series coupling capacitor 278.

For the channel B branch of the circuit in connection with the secondary winding 255, the phase-shift network 62 comprises a capacitor 280 in series with a variable resistor 281 connected between the terminals of the secondary 255 to provide variable capacitive reactance in the network. The secondary winding 255 is connected to chassis or ground through the tap connection 282, and output signals are derived from the signal network through that connection and a coupling capacitor 283 connected between an output terminal 284 at the junction of the resistor 281 and the capacitor 280. The first signal input grid 285 of a second pentagrid converter tube 286, in the detector 65, is provided with a grid resistor 287 connected to chassis or ground as shown and is coupled to the output terminal 284 through the capacitor 283. The tube 286 is a duplicate of the tube 261 for channel A and comprises a cathode 287 connected to ground and to a suppressor grid 288, a second signal input grid 289 provided with a screen grid 290, and an output anode 291. The output anode is connected with an output circuit 292 having an output coupling or load resistor 293 for supplying current thereto and for output coupling. The channel B output circuit lead 294 is coupled through an output coupling capacitor 295 and a low-pass filter 296 with the anode at the high signal potential terminal 297 of the coupling resistor 293 as shown.

The converters or detectors 64 and 65 for channels A and B respectively are product detector devices for the exalted carrier and received signals. Signal channel separation is provided therein through proper adjustment of the phase relation of the two applied signals under control of the phase-shift networks. The incoming IF modulated signal is derived from the low-impedance supply terminal 47 through the circuit lead 70 which is connected directly with the two second control grids 269 and 289 of the channel A and B detector tubes through a connection lead 298.

The signal input grids 269 and 289 are isolated from and prevented from having feedback coupling with the modulated signal source, which is the intermediate-frequency amplifier output circuit at the terminal 42, by the impedance stepdown circuit 45. This low-impedance signal input supply connection to the detectors is also prevented, by the buffer amplifier 48 and the loose coupling circuit 46, from coupling with the exalted-carrier oscillator.

The impedance of the coupling circuit between the exalted-carrier oscillator 44 and the phase-shift networks 61 and 62 is also maintained at a low value by the relatively low resistance of the signal output coupling or load resistor 211 in the screen grid circuit of the oscillator. By reason of this low-impedance coupling connection, the exalted-carrier signal input grids 260 and 285 of the converter-detector tubes 261 and 286 respectively, may be driven into grid current condition necessary for their operation, without any appreciable phase-shift in the driving or coupling circuits 59 and 60 which supply the exalted carrier to the two separated signal channels A and B.

Channel separation by transformer coupling with a common impedance element in the screen-grid circuit of the oscillator, rather than in the anode circuit, prevents the load provided by the detectors from reacting upon the tuned anode circuit 204 of the oscillator to vary or adversely affect its tuning response. Furthermore, the low-impedance screen grid output coupling connection effectively prevents undesirable feedback coupling between the detectors 64 and 65, and the exalted-carrier oscillator 44.

While the modulated incoming IF carrier signal is applied to the second signal input grids 269 and 289 of the tube detectors 261 and 286, the channel A and channel B exalted carrier signals, substantially free of phase and amplitude modulation, are applied to the first signal input grids 260 and 285, respectively, at phase angles of substantially $\pm 60^\circ$ to the applied IF carrier signal. In the detector tubes 261 and 286, the shifted exalted carrier signals are mixed with the modulated incoming IF carrier signals to provide a product signal. The resulting output signal from each detector tube is therefore the product of the two applied signals and will contain the modulation and sum and difference components. All components which result from the product of the injected IF carriers and the phase-shifted exalted carrier signals, except the audio or modulation signal, are removed by the low-pass filters 277 and 296.

The exalted-carrier phase shift in each channel is provided by the variable-resistance-controlled capacitive and inductive reactance type phase shift networks 60 and 61. Due to the simplified circuitry, these networks are both effective to provide a wide angular phase shift range and are stable in operation.

For the product detectors 261 and 286, the phase shift in each exalted carrier channel is such that the vector resultant of each exalted-carrier signal and the received carrier signal is placed at substantially 90°, or in quadrature, to the undesired sideband signal for each channel. In the circuit of FIGURE 6, the exalted-carrier signals are each shifted somewhat greater than 60°, one in a positive direction and the other in a negative direction, from the received IF carrier signal. Thus, referring to the vector diagrams of FIGURE 2, the exalted-carrier signals applied to the signal input grids 260 and 285 occupy the vector positions designated by the legends CR–1 and CR–2 in FIGURE 2 with respect to the received carrier signal C. There is no in-phase component of the undesired signal or sideband, and the quadrature component of the undesired signal resulting from the product of the lower sideband with the injected IF carrier is opposite in-phase to the quadrature component of the undesired signal resulting from the product of the upper sideband with the injected IF carrier. There is, therefore, negligible distortion resulting from undesired sidebands in each of the output signal channels.

Figure 7:
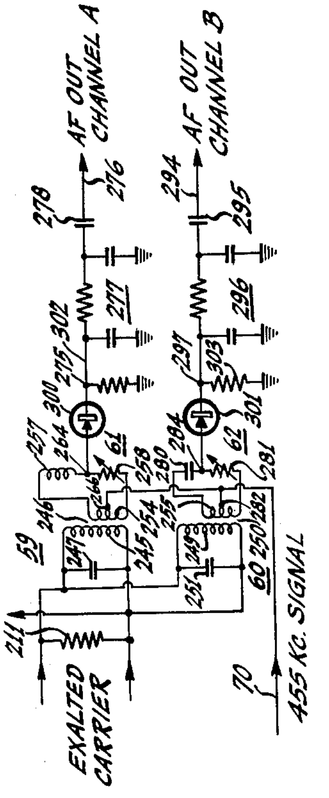
FIGURE 7 is a schematic circuit diagram showing a modification, in accordance with the invention, of the receiver circuits shown in FIGURE 6.

Referring now to FIGURE 7, a modification of the signal detector means for the receiver circuit of FIGURE 6 is shown, in which simple diode rectifier devices 300 and 301 are provided in channel A and channel B, respectively. In channel A, the rectifier 300 is connected with the phase-shift network output terminal 264 and to a signal output or load resistor 302. The output circuit 276 is connected through the low-pass filter 277 with the output resistor 302. The tap connections or terminals 266 and 282 on the secondary windings 254 and 255, respectively, for channels A and B, in this modification, are connected with the received carrier (IF) signal injection circuit 70, whereby the exalted-carrier signals and the injected-carrier signal are added vectorially in each diode rectifier circuit. The diode rectifier 301 in channel B is likewise connected with the output terminal 284 of the phase-shift network 60 and with a signal output or load resistor 303, as shown. The channel B output circuit 294 is connected through the low-pass filter 296 in parallel with the output resistor 303.

This circuit is otherwise the same as that shown in FIGURE 6 and operates to apply the signals to the detectors in the same manner as described therefor, with the exception that the vectorial addition of the signals in the detectors is substantially in accordance with the vector diagrams shown in connection with and as described for the circuit of FIGURE 2. While channel separation may not be as effective as in the circuit of FIGURE 6, the diode rectifier circuit shown in FIGURE 7 is less complicated than the penta-grid converters of FIGURE 6, and lower in cost. It also provides true vector addition and cancellation of the unwanted signals in both channels as pointed out above.

From the foregoing consideration of the phase-shifted double-sideband two-channel A.M. signal communication system of the present invention, it will be seen that effective channel separation and decoding may be attained with sidebands shifted less than the ±45° heretofore considered necessary. The present ±30° sideband phase shift system sacrifices very little in signal-to-noise ratio for dual channel or stereophonic operation, while gaining considerably in compatibility for monophonic reception on standard A.M. receivers. For the latter use the present system provides substantially better signal-to-noise ratio and much less second harmonic distortion.

In addition, for both monophonic and stereophonic reception, conventional single-channel A.M. signal receiving and translating circuits may be used, including the second or audio detector. For the two-channel or stereophonic receiver, an additional carrier-frequency oscillator is phase locked with the received IF signal, and the signal output of this oscillator is used as an exalted carrier signal for channel separation and decoding. With simplified low-cost circuitry, the two-channel or stereophonic receiver of the present invention provides full channel separation and exalted carrier operation which is free of phase and amplitude modulation to a degree not realized heretofore with phase-shifted double-sideband A.M. systems for two-channel signal transmission.

What is claimed is:

1. A two-channel signal communications system comprising, a signal transmitter and a signal receiver operating with a two-channel amplitude-modulated phase-shifted double-sideband carrier signal, the angular relation of the sidebands to the carrier signal or phase shift of the sidebands from the transmitted and received carrier signal being maintained between +25° and +30° for one pair of sidebands and between −25° and −30° for the other pair of sidebands, means in said transmitter for generating and transmitting said signal, means in said receiver for separating and decoding said signal to derive the two-channel modulation components thereof, said last named means comprising a loosely-coupled exalted-carrier oscillator, channel separation circuits coupled to said exalted-carrier oscillator, an automatic-gain-control circuit for compensating for variations in the strength of the received carrier signal, and an automatic-frequency-control circuit for said exalted-carrier oscillator responsive to the phase differential of the received carrier and exalted-carrier signals.

2. A signal communications system for two-channel stereophonic amplitude-modulated signal transmission and reception and compatible for monophonic signal reception comprising, means for generating and transmitting a composite two-channel amplitude-modulated carrier signal with a first set of upper and lower sidebands shifted plus 25° to 30° therefrom for one modulation channel and with a second set of upper and lower sidebands shifted therefrom minus 25° to 30° for the other modulation channel, the total angle between channel sidebands being substantially 50° to 60°, and means for receiving and decoding from said signal two separate modulation components including a signal-frequency phase-locked exalted-carrier oscillator and an automatic-frequency-control circuit therefor responsive to the phase differential of the received-carrier and the exalted-carrier signals.

3. A two-channel signal transmission and reception system comprising, an amplitude-modulation signal transmitter, means in said transmitter for providing a two-channel double-sideband, amplitude-modulated carrier signal with the sidebands phase-shifted with respect to the carrier on the order of plus and minus 30° respectively for increased compatibility for single-channel amplitude-modulation signal reception, a two-channel amplitude-modulation signal receiver having single-channel tuning and translating circuits responsive to the transmitter signal for producing an intermediate-frequency signal, means in said receiver for maintaining substantially a constant phase relation between the double sidebands of the received signal and with the same angular relation to the carrier of on the order of plus and minus 30° as provided by the transmitter, and means including an exalted-carrier oscillator phase-locked with said intermediate-frequency signal for separating and decoding the double-sideband modulation of said received signal in two separate modulation-signal output channels.

4. An amplitude-modulated double-sideband two-channel signal communications system comprising, a transmitter having means for generating a basic carrier signal, means for separating said carrier signal into two carrier components, means for amplitude modulating said carrier components stereophonically and each with double sidebands, means for shifting the phase of said modulated carrier components plus and minus 30° with respect to the phase of the basic carrier signal thereby to shift the carrier component sidebands substantially 60° apart, means for combining said carrier components to provide a composite transmitted carrier signal having plus and minus 30° phase-shifted double sidebands, an amplitude-modulation signal receiver responsive to the frequency of said transmitted carrier signal, means in said receiver providing an automatic-gain-controlled intermediate-frequency signal corresponding to said carrier signal, an exalted-carrier oscillator operable at the carrier-signal frequency, means including a low impedance coupling circuit for applying said intermediate-frequency signal to said oscillator to phase lock said oscillator at said signal frequency, means for deriving two carrier signal components from said exalted-carrier oscillator in two separate channels, signal demodulator means in each of said channels, means including said low impedance coupling circuit for applying a component of the received intermediate-frequency signal to each of said demodulator means, and means for shifting the phase of each exalted carrier component to derive in each channel the stereophonic channel modulation applied to the composite signal carrier at the transmitter.

5. An amplitude-modulated double-sideband two-channel signal communications system comprising, a transmitter having means for generating a basic carrier signal, means for separating said carrier signal into two carrier components, means for amplitude modulating said carrier components stereophonically and each with double sidebands, means for shifting the phase of said modulated carrier components ±30° with respect to the phase of the basic carrier signal thereby to shift the sidebands substantially 60° apart, means for combining said carrier components to provide a composite transmitted carrier signal having ±30° phase-shifted double sidebands, an amplitude-modulation signal receiver responsive to the frequency of said transmitted carrier signal, means in said receiver providing an automatic-gain-controlled modulated-intermediate frequency signal corresponding to said received modulated-carrier signal, an exalted-carrier oscillator means operable at the intermediate signal frequency, means including a low impedance coupling circuit for applying said intermediate-frequency signal to said oscillator to phase lock said oscillator at said intermediate signal frequency, means for deriving two intermediate frequency signal components from said exalted-carrier oscillator in two separate channels, modulation signal detector means in each of said channels, low-impedance circuit means for applying to said detector means a component of the automatic-gain-controlled intermediate frequency signal along with the exalted-carrier-derived component in each channel, and a phase-shift network interposed in each channel between the exalted-carrier oscillator and the signal detector therein, said phase-shift networks being variable to shift the phase of the exalted intermediate frequency signal with respect to the intermediate frequency signal to provide a resultant carrier signal component for each channel having a quadrature and an in-phase relation to the two separated exalted-intermediate frequency signal components, whereby the stereophonic modulation components of the carrier are separated and detected in said detector means in each channel, and means providing a modulation signal output circuit for each detector means.

6. In an amplitude-modulation signal transmitting and receiving system employing a transmitted carrier signal having dual-channel double-sideband amplitude modulation phase-shifted with respect to the carrier signal on the order of plus 30° for sidebands corresponding to one of said channels and in the order of minus 30° for sidebands corresponding to the other of said channels for compatible monophonic single-channel reception, a two-channel amplitude-modulation signal receiver having single-channel tuning and signal translating means responsive to the frequency of said transmitted carrier signal, means in said receiver providing an automatic-gain-controlled intermediate-frequency signal corresponding to said carrier signal, an exalted-carrier oscillator operable at the intermediate signal frequency, a low impedance coupling circuit for applying said intermediate-frequency signal to said oscillator to phase lock said oscillator at the intermediate signal frequency, means for deriving two signal components from said exalted-carrier oscillator in two separate channels and including two parallel signal conveying circuits, signal demodulator means in each of said circuits, a signal injector circuit coupled to said low impedance coupling circuit for applying a component of the received intermediate-frequency signal to each of said demodulator means, and means in each channel circuit coupled between the exalted carrier oscillator and the demodulator means for effecting opposite phase shifts in the signal components therein for application to said demodulator means to derive the dual-channel modulation applied to the transmitted carrier signal.

7. In an amplitude-modulation signal transmitting and receiving system employing a transmitted carrier signal having dual-channel double-sideband amplitude modulation phase-shifted with respect to the carrier signal within on the order of plus 30° for sidebands corresponding to one of said channels and on the order of minus 30° for sidebands corresponding to the other of said channels for compatible monophonic single-channel reception, a two-channel amplitude-modulation signal receiver having single-channel tuning and signal translating means responsive to the frequency of said transmitted carrier signal, means in said receiver providing an automatic-gain-controlled intermediate-frequency signal corresponding to said carrier signal, an exalted-carrier oscillator operable at the intermediate signal frequency, said oscillator including a screen-grid tube having a tuned anode circuit and a screen-grid resistor providing signal output coupling means therefor, means including a low impedance coupling circuit for applying said intermediate-frequency signal to said oscillator to phase lock said oscillator at the intermediate signal frequency, said last named means further including an amplifier having a tuned output circuit and a signal coupling resistor connected between said tuned anode circuit and said tuned output circuit to provide loose signal-transfer coupling therebetween, means coupled with said screen-grid resistor for deriving two signal components from said exalted-carrier oscillator in two separate channels and including two parallel signal conveying circuits, signal demodulator means in each of said circuits, a signal injector circuit coupled to said low-impedance coupling circuit for applying a component of the received intermediate-frequency signal to each of said demodulator means, and means in each channel circuit coupled between the exalted-carrier oscillator and the demodulator means for effecting opposite phase shifts in the exalted-carrier oscillator signal components therein for application to said demodulator means to derive the dual-channel modulation applied to the transmitted carrier signal.

8. In a radio signal communications system operable with two-channel amplitude modulation and a single transmitted carrier signal having double sidebands phase shifted plus and minus 25° to 30° from the carrier signal, an amplitude-modulation signal receiver having single-channel signal receiving and translating means responsive to the frequency of said transmitted carrier signal, means in said receiver providing an automatic-gain-controlled modulated carrier signal corresponding to said received modulated carrier signal, exalted-carrier oscillator means operable at the automatic-gain-controlled modulator carrier signal frequency, means including a low-impedance coupling circuit for applying said automatic-gain-controlled modulated carrier signal to said oscillator means to phase lock said oscillator means at said automatic-gain-controlled modulated carrier signal frequency, loose coupling means for deriving two carrier signal components from said exalted carrier oscillator means in two separate channel circuits, modulation-signal detector means in each of said circuits, low impedance circuit means for applying to said detector means a component of the automatic-gain-controlled carrier signal along with said exalted-carrier-derived signal component from each channel circuit, and a phase-shift network interposed in each channel circuit between the exalted carrier oscillator means and the signal detector means therein, said phase-shift networks being variable to shift the phase of the separate exalted-carrier signal components with respect to the received carrier signal in opposed vectorial directions to provide a resultant carrier signal component for each channel having a quadrature and an in-phase relation to the two separated exalted carrier signal components, whereby the modulation components of the carrier signal are separated and detected in said detector means in each channel, and means providing a modulation signal output circuit for each detector means.

9. An amplitude-modulation broadcast receiver for dual-channel double-sideband reception in which the sidebands are phase shifted substantially plus and minus 30° from the carrier signal comprising, single-channel signal receiving and translating circuits including a local oscillator and an intermediate-frequency amplifier coupled to a signal rectifier, means including said rectifier providing automatic gain control for said signal translating circuits, an exalted-carrier oscillator tuned to the intermediate frequency and coupled to the output end of the intermediate-frequency amplifier through circuit means including a stepdown coupling transformer and a buffer signal amplifier in the order named, said oscillator and amplifier having individual tuned circuits responsive to the intermediate-frequency signal and loose coupling means for signal transfer therebetween, automatic frequency control means including a signal rectifier differentially coupled to said tuned circuits and connected to control the frequency of the local oscillator and the phase of the exalted-carrier oscillator thereby to maintain the exalted-carrier oscillator locked to the intermediate-frequency signal, exalted-carrier oscillator output circuit means effectively decoupled from said tuned exalted-carrier oscillator circuit, a pair of output signal circuits connected with said output circuit means to derive therefrom two carrier signal components in two separate channels, signal demodulator means in each of said channel circuits, means including said step-down transformer for applying a component of the received intermediate-frequency signal to each of said demodulator means, and means in each channel circuit coupled between the exalted carrier-oscillator and the demodulator means for effecting opposite phase shifts in the carrier signal components to derive the dual channel modulation.

10. An amplitude-modulation broadcast receiver for dual-channel double-sideband signal reception in which the sidebands are phase shifted substantially plus and minus 30° from the carrier signal comprising, single-channel signal receiving and translating circuits including a tunable local oscillator and an intermediate-frequency amplifier coupled to a signal rectifier, means for deriving automatic-gain-control potentials from said rectifier for said signal translating circuits thereby to provide substantially a constant signal amplitude at the output end of the intermediate-frequency amplifier, an exalted-carrier oscillator tuned to the intermediate frequency and coupled to the output end of the intermediate-frequency amplifier through a low impedance circuit and a buffer amplifier in the order named, said exalted-carrier oscillator and buffer amplifier having tuned circuits responsive to the intermediate-frequency signal and loose resistive coupling means for signal transfer therebetween, automatic-frequency-control means including a signal rectifier differentially coupled to the buffer amplifier and the exalted-carrier oscillator and responsive to phase error between the intermediate-frequency and exalted-carrier-oscillator signals to control the frequency of the local oscillator and the phase of the exalted-carrier oscillator, a screen-grid oscillator tube in said exalted-carrier oscillator having a screen-grid resistor providing signal output coupling means effectively decoupled from said tuned exalted-carrier circuit, a pair of output signal circuits coupled to said resistor in parallel relation to derive therefrom two carrier-signal components in two separate channels, signal demodulator means in each of said channel circuits, means including said low impedance coupling circuit for applying a component of the received intermediate-frequency signal to each of said demodulator means, and means in each channel circuit coupled between the exalted-carrier oscillator and the demodulator means for effecting opposite phase shifts in the carrier signal components to derive the dual-channel modulation.

11. In a two-channel amplitude-modulation signal transmitter, the combination of, means for deriving two modulated carrier-signal components including a pair of signal amplifiers and a driver amplifier therefor coupled to receive a basic carrier signal at a predetermined frequency, means providing an input circuit for said signal amplifiers coupled to said driver amplifier for affecting channel separation, means providing a signal output circuit for each of said signal amplifiers tuned to the carrier frequency, means for applying a modulation signal to each of said signal amplifiers to provide separate modulated-carrier signal components in said output circuits, a phase-shift network coupled to each of said output circuits for shifting the phase of said modulated-carrier signal components in opposed relation substantially 60° apart, whereby they are phased plus and minus 30° from the basic carrier signal, and means for combining the carrier signal components to provide a composite carrier signal for transmission with double sidebands shifted substantially 60° apart.

12. In a two-channel amplitude-modulation signal transmitter, the combination of, means for providing a basic carrier signal at a predetermined frequency, channel dividing means coupled to said last named means to provide two carrier signal components of substantially equal amplitude, means providing amplitude modulation of said components after channel division and phase-shift thereof following said modulation, said last named means comprising of a pair of signal amplifiers having a push-pull signal input circuit coupled to said carrier source and having individual output circuits, a phase-shift network coupled to each of said output circuits, means for adjusting said phase-shift networks to provide carrier signal component phase separation of 50° to 60° and plus and minus 25° to 30° from the basic carrier signal, and means providing a common output circuit for said carrier signals coupled to said phase-shift networks to combine the carrier component signals into a composite transmitted carrier signal at the basic carrier frequency and with double sidebands shifted plus and minus 25° to 30° therefrom, for compatible two-channel and single-channel amplitude-modulation signal reception of said transmitted carrier signal.

13. In a two-channel amplitude modulation signal transmitter, the combination as defined in claim 12, in which a stepdown output coupling transformer is provided between the signal amplifier and the phase-shift network in each divided channel, and in which the coupling between the driver amplifier and the push-pull input circuit of the signal amplifiers is provided by a coupling transformer having a balanced secondary winding and a primary winding tuned to the basic carrier signal frequency.

14. A stereophonic amplitude-modulation signal transmitter comprising in combination, a carrier signal source including an oscillator tuned to a predetermined frequency, a buffer signal amplifier coupled to said oscillator for receiving the signal output therefrom, means providing a tuned signal output circuit for said amplifier including the primary of a coupling transformer having a balanced secondary to effect channel division and provide thereby two separate carrier signal components for stereophonic signal modulation, means for deriving two stereophonic modulating signals, modulator means for applying said modulating signals to said separate carrier signal components, means for shifting the phase of the modulated channel carrier signal components in the range of from 50° to 60° apart, means for adding said carrier components vectorially to provide a resultant modulated carrier signal with double sidebands phase-shifted within the range of from plus and minus 25° to 30° with respect thereto, and means for amplifying and radiating the modulated double-sideband carrier for compatible monophonic and stereophonic signal reception.

15. In a two-channel amplitude-modulation signal transmitter, the combination with a carrier signal source, of a pair of class C radio frequency amplifiers coupled in push-pull relation thereto for carrier signal division and having transformer-coupled output circuits connected for deriving two carrier signal components in in-phase relation, a phase-shift network connected with each of said amplifiers through said transformer coupling, and the transformer coupling in each signal channel including a stepdown transformer having a tuned primary winding and a secondary winding included in the phase-shift network, means for adjusting the relative signal amplitudes of the separated modulated carrier signal components, and means for vectorially adding said components to provide a resultant transmitted carrier signal having double sidebands phase-shifted equally with respect of said resultant carrier signal less than on the order of plus and minus 30° respectively.

16. A two-channel amplitude-modulation signal transmitter comprising in combination, means providing a carrier signal of constant frequency, means providing two signal translating channels, each channel including a carrier signal amplifier, means for appplying individual amplitude modulation signals to said amplifiers, means providing channel separation and coupling for signal transfer from said carrier signal source to said amplifiers in push-pull relation, thereby to provide two separate amplitude-modulated carrier signal components, a signal output circuit for each of said carrier signal amplifiers including transformer coupling means for affecting phase reversal of the output signal in one channel, phase-shift networks coupled to said output circuits to adjust the phase angularity betwen the separated carrier signal components substantially +30° in one channel and −30° in the other channel, means for vectorially adding the output signals from said phase-shift networks to provide a resultant carrier signal having double-sideband two-channel modulation with the same sideband relative phase angularity as provided by the phase-shift networks.

17. In a two-channel amplitude-modulation signal transmission and reception system, the combination of, a transmitter including an oscillator providing a carrier signal source, a carrier-signal buffer amplifier coupled to said oscillator to receive the signal output therefrom, a pair of carrier-signal amplifiers having input circuits coupled to said buffer amplifier to provide effective channel separation, a phase-shift network coupled to each of said last named amplifiers to shift the carrier signal phase relation within a range of plus and minus 25° to 30° at the output ends thereof, means coupled to each of said last named amplifiers and preceding the phase shift networks in circuit for modulating the signal flow therethrough to provide two-channel signal transmission, means for combining the modulated signal output from said phase-shift networks to provide a resultant carrier signal with two-channel double-sideband modulation having phase angles with respect to the carrier within the range of plus and minus 25° to 30°, an amplitude-modulation receiver tunable to the transmitter frequency, means in said receiver for maintaining substantially a constant phase relation between the double sidebands of the received signal and with the same angular relation to the carrier within the range of plus and minus 25° to 30° as provided by the transmitter, and means for separating and decoding the two-channel double-sideband modulation of said received signal in two separate modulation signal output channels.

18. In a two-channel A.M. signal transmission and reception system, the combination of, a transmitter comprising a carrier signal source, a pair of class C RF amplifiers coupled in push-pull relation thereto for carrier signal division and having transformer coupled output circuits connected for deriving two carrier signal components in in-phase relation, a phase-shift network connected with each of said amplifiers through said transformer coupling, and the transformer coupling in each signal channel including a stepdown transformer having a tuned primary winding and a secondary winding included in the phase-shift network, means for adjusting the relative signal amplitudes of the separated modulated carrier signal components, means for vectorially adding said components to provide a resultant transmitted carrier signal having double sidebands phase-shifted equally with respect of said resultant carrier signal and in the order of plus and minus 30°, an amplitude modulation signal receiver tunable to said transmitted signal and having means for separating and decoding a received signal from said transmitter, and means in said receiver for maintaining substantially a constant phase angle between said sidebands and the carrier signal which is the same as the transmitted signal, said system thereby providing reduced harmonic distortion and increased compatibility for conventional monophonic amplitude-modulation signal reception.

19. In a radio signal transmission and reception system, the combination with a transmitter having means for producing a phase-shifted double-sideband amplitude-modulated carrier signal with dual-channel modulation on both side bands and with the sidebands displaced from the carrier signal on the order of plus and minus 30° respectively, of an amplitude-modulation signal receiver tunable to said transmitted signal for separating and decoding the dual-channel modulation signals therefrom, said receiver comprising, single-channel signal receiving and translating circuits including a tunable local oscillator and an intermediate-frequency amplifier coupled to a signal rectifier, means for deriving automatic-gain-control potentials from said rectifier for said signal translating circuits thereby to provide substantially a constant signal amplitude at the output end of said amplifier, an exalted-carrier oscillator tuned to the intermediate frequency and coupled to the output end of said amplifier through low impedance circuit means including a buffer amplifier, said exalted-carrier oscillator and buffer amplifier having tuned circuits responsive to the intermediate-frequency signal and loose resistive coupling means for signal transfer therebetween to phase lock said oscillator to said signal, differential means responsive to phase error between the intermediate frequency and exalted-carrier oscillator signals to control the frequency of the local oscillator and the phase of the exalted carrier oscillator, a pair of signal output circuits coupled to said exalted-carrier oscillator to derive therefrom two carrier signal components in two separate channels, signal demodulator means in each of said channel circuits, means for applying a component of the received intermediate-frequency signal to each of said demodulator means, and means in each channel circuit coupled between the exalted-carrier oscillator and the demodulator means for effecting opposite phase shifts in the carrier signal components to derive the dual-channel modulation therefrom.

References Cited in the file of this patent

UNITED STATES PATENTS 1,608,566 Potter ---------------- Nov. 30, 1926

OTHER REFERENCES

Color Television Fundamentals by Kiver, copyright 1955 by McGraw-Hill, pp. 46 and 50, TK 6670K5.